Dec. 4, 1956     H. V. LEIDA     2,773,174
LIGHT PROJECTOR
Filed Nov. 19, 1952     2 Sheets-Sheet 1
FIG. I.
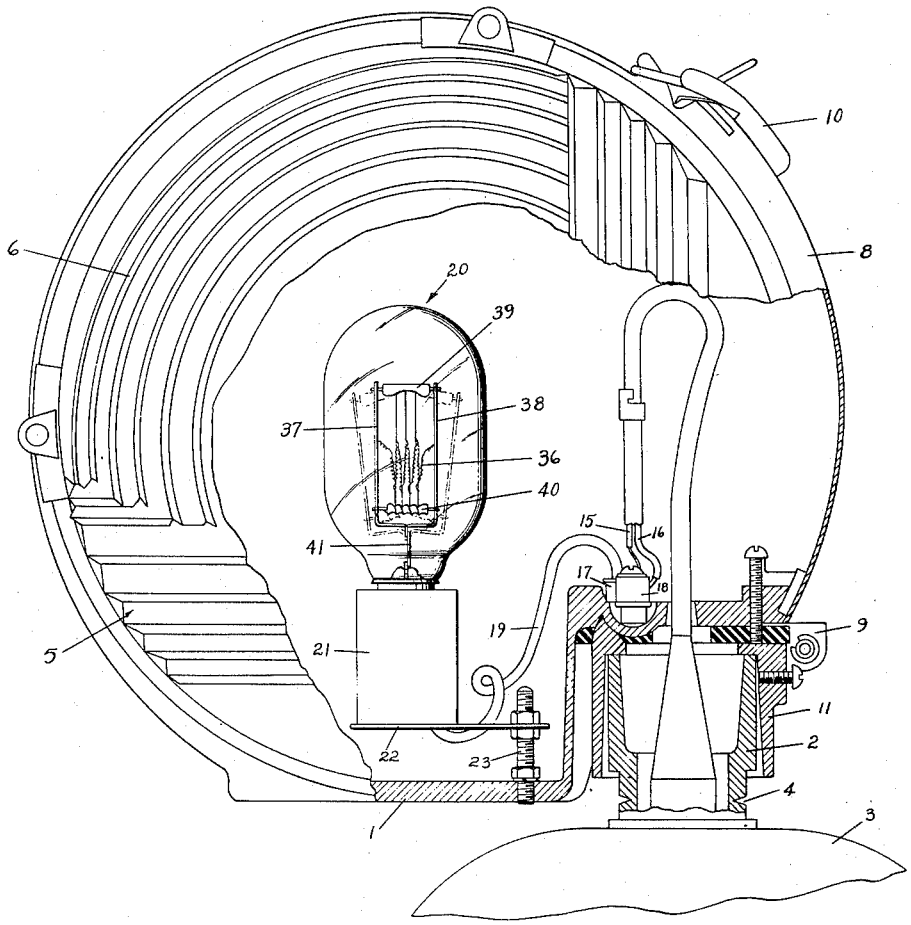
INVENTOR.
Harry V. Leida
BY
Arnold J. Ericsen
Attorney

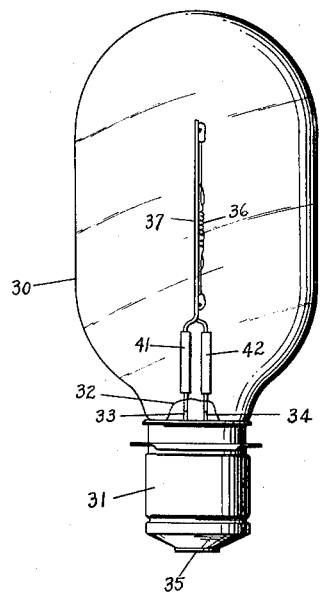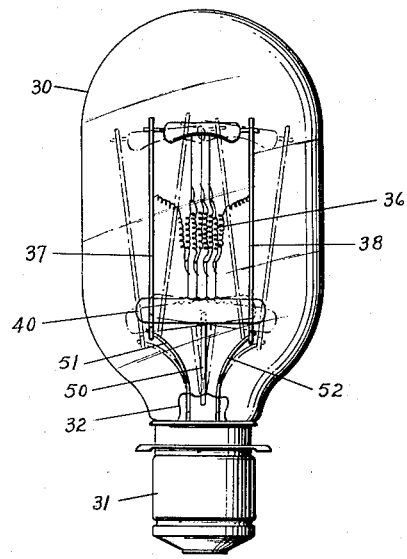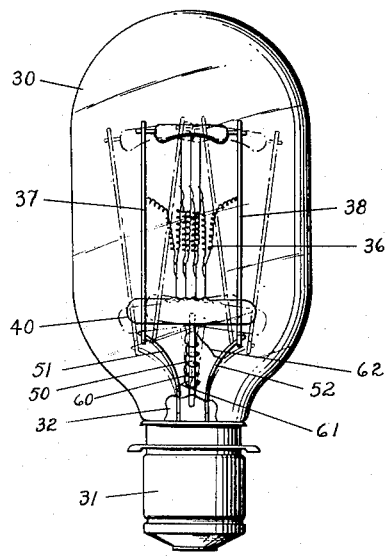

United States Patent Office 2,773,174
Patented Dec. 4, 1956

2,773,174

LIGHT PROJECTOR

Harry V. Leida, East Stroudsburg, Pa., assignor to McGraw Electric Company, Milwaukee, Wis., a corporation of Delaware Application November 19, 1952, Serial No. 321,447

16 Claims. (Cl. 240—1.2)

The present invention relates to projection type electric lamps, and is particularly related to lamps used as light sources in airport contact or runway marker lights of the variety incorporating a controllable-beam mechanism.

Continued studies and operating practice has brought forth the introduction of controlled-beam runway light projectors for providing a glare-free signal to approaching aircraft under even the most adverse weather conditions. Heretofore, controlled-beam projectors have given meritorious service, but comprise relatively expensive and complex lens structures, mechanisms and means for operating such mechanisms. In addition, skilled operators were necessary to operate the equipment at its maximum effectiveness.

It is the usual practice to install a series of sets of controlled-beam lights parallel with one another along both sides of the approach and runway. The lights are provided with means for establishing correct brightness to the pilot when landing or taking off. Operation of a controllable unit is based on a fundamental accepted formula, such as Allard's law. In essence, this law provides that when a light just visible in an obstructing atmosphere, such as fog, is being observed and an uncontrolled light is placed between it and the observer, the light farther away becomes invisible because the light reflected off the atmosphere particles around the nearer light becomes brighter than the light emanating from the more distant source. The halo in fog is caused by a light shining on the fog at an angle to the direct line of vision and of such intensity that it is reflected off or is refracted by the drops of moisture making them visible. When the distribution and intensity of the light source are controlled so that only direct light (with just sufficient candle power) penetrates to the point of observation, the light appears as a point source and the halo or fogging, of the atmosphere about it is kept to a minimum correct beam, which thereby minimizes the possibility of a "glare barrage."

Under a controlled system with relatively clear atmospheric conditions the main light shaft is projecting substantially parallel to the runway at relatively low intensity. Obviously, under restricted visibility the light envelope shrinks with the penetration of the higher candle-power beams being reduced more than that of the lower candle power beam according to Allard's law. Therefore, the effective areas fall away from the center line of the runway. Merely increasing the output of the lamp does not restore the path of equal brightness. Only by re-focusing and "toeing in" the path of the maximum candle power beam towards the center of the runway, can the relatively darker area be eliminated and the path of equal brightness be restored.

A substantial improvement in controlled-beam runway lights has been described and claimed in the copending application Serial No. 323,656, filed by Philip B. Clark, on December 2, 1952, and assigned to the same assignee as the present invention. The subject matter of the present invention constitutes a further improvement of the Clark structure.

Referring now to the drawings:

Fig. 1 is an elevational view, partly in section, of a light projector of the runway marker type including a stationarily mounted projector lamp provided in accordance with the present invention.

Fig. 2 is an enlarged side view of the lamp structure shown in Fig. 1.

Figs. 3 and 4 are elevational views of lamp structures illustrating other embodiments of their invention.

With reference to Fig. 1, it will be seen that an improved contact or runway marker light projector, provided in accordance with the present invention, may comprise a cast housing member 1 supported by a vertical support member 2, projecting from a mounting base 3. The support member is preferably provided with an annular break-off groove 4, which is relatively frangible in order to shear at the least expensive portion of the projector if the projector should be accidently collided with by an approaching airplane, snowplow, or other moving object.

The lens structure 5 is mounted on the housing 1 in the usual manner and forms a part of the copending application, Serial No. 328,631, filed by Philip B. Clark on December 30, 1952, and assigned to the same assignee as the present invention. Suffice it to say for the present, that the lens structure 5 is interchangeable for use with a dual lens structure having opposed lenses on either side of the light source. The particular lens shown comprises a focusing portion, which includes refracting prisms 6, a portion of which preferably provides a "bull's-eye" focusing means (not shown).

The housing 1 is provided with a maintenance-entrance door 8 pivotally mounted on trunnions 9, and engageable with the housing at its free end by means of a conventional latching means 10. It is preferable to position the housing 1 on a slip-fitter casting 11, which will permit a convenient means for orienting the projector both vertically and horizontally.

Line connections to the projector are made through conventional conductors 15 and 16, one of which may be grounded if so desired. The conductors are electrically connected to upright terminals 17 and 18, respectively. It will be apparent that the base 3 may be mounted directly on an individual transformer (not shown), or connected directly to a multiple electrical circuit (not shown) in the usual manner.

The light source comprises a conventional lamp structure, which has been modified in accordance with the teachings of the present invention. Various embodiments of the novel lamp structure will hereinafter be described. The embodiment disclosed in Figs. 1 and 2 is preferred where it is desired to eliminate the need for auxiliary pilot control circuits, such as under initial installations of runways and associated equipment. Direct electrical connection to the line terminals 17 and 18 may be made by means of a dual wire conductor 19. However, it will be apparent from the following description that the lamp may be modified to operate in projectors that are provided for existing installations that have been set up with pilot wire control circuits. The lamp 20 of the embodiment illustrated in Figs. 1 and 2 is conventionally arranged for releasable operating engagement with a conducting socket member 21. It is generally advisable to provide a socket member that will permit the normally expendable lamp to be mounted in a predetermined position with respect to the lens 5. Such socket members are well-known and include resilient indexing means (not shown) for seating projection lamps in a predetermined position relative to the socket member and the lens of the projector.

The socket member 21 is preferably stationarily mounted on an adjustable supporting platform 22, which is fastened to the housing 1 by means of a plurality of stud and nut assemblies 23. These assemblies permit a vertical adjustment of the platform with respect to the focusing portion of the lens 5, which adjustment will permit the lamp to be pre-focused in accordance with existing standards.

Throughout the following description it will be apparent that certain portions of the lamp structure are substantially identical with like portions of other embodiments. Therefore, like parts will be designated by like reference characters. The lamp 20, provided in accordance with the present invention, comprises the following components: The lamp structure may be of the usual projector-type modified in accordance with the teachings of the present invention, and is particularly shown in Fig. 2. Essentially, the projector lamp may comprise a conventional gas-filled, transparent envelope 30 mounted on a conducting base 31. An insulating stem 32 projects inwardly of the envelope, and is adapted to support lead-in wires 33 and 34. One lead-in wire is soldered (not shown) to the rim of the base and the other to the center contact 35.

Referring now to the embodiment disclosed in Figs. 1 and 2, the filament 36 may be of the conventional biplane variety suspended between parallel support wires 37 and 38, and vertically supported by insulating members 39 and 40.

A prime mover is provided for angularly deflecting the filament 36, relative to the longitudinal axis of the envelope 30 and/or the focal axis of the lens structure 5. It has been the practice heretofore to provide a prime mover for angularly deflecting the entire lamp structure as a unit. The prime mover of the present embodiment forms an integral part of the lamp 20, and comprises current-carrying bi-metallic actuator strips 41 and 42 forming a portion of the conducting support wires 37 and 38. Although an individual bi-metallic strip has been provided for each support wire, it will be apparent from the following description that a single bi-metallic strip may be used where it is so desired. It will be apparent that the bi-metallic strips are caused to bow due to their inherent ohmic resistance as electric energy is supplied thereto. As shown in Fig. 1, the flexure of the bi-metallic strips will cause an angular deflection of the filament 36, attached to the support wires 37 and 38, responsive to the energy supplied—in this case to both the bi-metallic strips 41 and 42 and the filament which is in series electrical connection therewith. The bi-metallic actuator strips may be positioned as desired to provide a particular deflection of the filament, and preferably with the high-expansion metal to the right, as shown in Fig. 1. This will cause the filament to be deflected to the right as shown in the dot-dash line when full operating current is supplied. The position of the filament shown by the full lines indicates the deflection of the filament at no-current condition or at least at very low-current supply.

It will be apparent that it is desirable to mount the bi-metallic strips as near to one another as practicable to minimize any calibration differential between the two strips. It will also be apparent that the bi-metallic actuator may take the form of a single bi-metal (not shown), which may be of the coiled-coil variety integral with one of the support wires. This variety may be adapted to provide a longitudinal motion on heating. The other support wire will accordingly be movable rotatively from a pivot support (not shown).

The embodiment of the projector lamp illustrated in Fig. 3 utilizes a prime mover for the angular deflection of the filament which comprises a bi-metallic actuator 50, which is energized from direct filament radiation. The bi-metallic actuator 50 shown therein is supported at its lower end by the insulating stem 32. The upper end of the bi-metallic actuator engages the insulating member 40. The support wires 37 and 38 have been slightly modified, as shown to supportingly engage the relatively flexible conducting supporting members 51 and 52, respectively.

In this case, angular deflection of the filament 36 and the support wires 37 and 38 is provided by flexure of the bi-metallic actuator 50 responsive to the quantity of calorific energy supplied from filament radiation. Thus, it will be seen that the more current that is supplied to the filament, the more heat energy will be radiated in direct relationship to the amount of light energy emitted, causing a concurrent flexure of the bi-metal actuator.

Although the actuator 50 has been shown to be non-conductive and in direct operating engagement with the lower insulating member 40, it will be understood that the invention should not be limited to this precise structure, as the bi-metallic actuator may be positioned in any convenient manner to provide an angular deflection from the filament 36. In fact, if it is so desired, the bi-metal may be made current-carrying and be connected to a separate pilot control circuit (not shown) and remain within the scope of this invention.

The embodiment of the lamp structure illustrated by Fig. 4, utilizes substantially the same components as the embodiment of Fig. 3, with addition of an auxiliary heating means for motivating the actuator 50. This auxiliary heating means preferably takes the form of a coiled resistance wire positioned circumjacently of the actuator 50. The coil 60 may be electrically connected through lead wires 61 and 62 to the conducting supporting members 51 and 52, respectively. Obviously, this embodiment may be modified to provide a separate electrical connection to the heater coil 60 through a pilot controlled circuit (not shown), if such is desired.

It will be understood, that in all of the embodiments described, it may be considered desirable to provide re-indexing or compensating means for the various bi-metallic actuators. However, inasmuch as all of the actuators are enclosed by the transparent envelope of the lamp structure and are preferably placed in close proximity of the filament, variations in ambient temperature affecting the exterior of the lamp will not materially affect the operation of the bi-metal actuator enclosed within the gas-tight envelope.

I claim:

1. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, and a prime mover being operatively associated with said filament to move said filament relative to said focal axis responsive to the quantity of energy supplied to said prime mover.

2. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, and a prime mover being operatively associated with said filament and in electrical connection therewith, said prime mover being arranged to move said filament relative to said focal axis responsive to the quantity of energy supplied to said filament and to said prime mover.

3. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, and a prime mover comprising a bi-metallic element and being operatively associated with said filament to move said filament relative to said focal axis responsive to the quantity of energy supplied to said prime mover.

4. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, and a prime mover comprising a current-carrying bi-metallic element and being operatively associated with said filament and in electrical connection therewith, said bi-metallic element being engaged to move said filament relative to said focal axis responsive to the quantity of current supplied to said filament and to said prime mover.

5. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, and a current-carrying bi-metallic element integral with one of said support members and arranged to deflect said filament a predetermined distance relative to said focal axis responsive to the quantity of energy supplied to said filament.

6. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, and a bi-metallic element operatively associated with said filament to move said filament relative to said focal axis responsive to the quantity of radiant energy emanating from said filament.

7. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, a thermally responsive actuator operatively associated with said filament, and an auxilliary heating means for motivating said actuator responsive to electrical energy supplied to said means, said actuator being arranged to move said filament relative to said focal axis responsive to the quantity of current supplied to the heating means.

8. A contact or runway light projector comprising a housing, a lens having a focal axis and being mounted on said housing, and a light source for said projector comprising a light transmitting envelope in fixed position relative to said housing, lead-in wires, and a filament having supports projecting therefrom and being supported in a predetermined position relative to the focal axis of said lens, said filament being arranged for electrical connection with said lead-in wires, a bi-metallic actuator operatively associated with said filament, and a heater coil for motivating said actuator responsive to electrical energy supplied to said coil, said bi-metallic actuator being arranged to move said filament relative to said focal axis responsive to the quantity of current supplied to said prime mover.

9. In an electric projector lamp comprising a light transmitting envelope defining a longitudinal axis concentric therewith, lead-in wires, and a filament having support members projecting therefrom and being supported in a predetermined position relative to said longitudinal axis, said filament being arranged for electrical connection with said lead-in wires; a prime mover being operatively associated with said filament to move said filament a predetermined distance relative to said axis responsive to the quantity of energy supplied to said prime mover.

10. In an electric projector lamp comprising a light transmitting envelope defining a longitudinal axis concentric therewith, lead-in wires, and a filament having support members projecting therefrom and being supported in a predetermined position relative to said longitudinal axis, said filament being arranged for electrical connection with said lead-in wires; a prime mover being operatively associated with said filament and in electrical connection therewith, said prime mover being arranged to move said filament a predetermined distance relative to said axis responsive to the quantity of energy supplied to said filament and to said prime mover.

11. In an electric projector lamp comprising a light transmitting envelope defining a longitudinal axis concentric therewith, lead-in wires, and a filament having support members projecting therefrom and being supported in a predetermined position relative to said longitudinal axis, said filament being arranged for electrical connection with said lead-in wires; a prime mover comprising a bi-metallic element and being operatively associated with said filament to move said filament a predetermined distance relative to said axis responsive to the quantity of energy supplied to said prime mover.

12. In an electric projector lamp comprising a light transmitting envelope defining a longitudinal axis concentric therewith, lead-in wires, and a filament having support members projecting therefrom and being supported in a predetermined position relation to said longitudinal axis, said filament being arranged for electrical connection with said lead-in wires; a prime mover comprising a current-carrying bi-metallic element and being operatively associated with said filament and in electrical connection therewith, said bi-metallic element being arranged to move said filament a predetermined distance relative to said axis responsive to the quantity of current supplied to said filament and to said prime mover.

13. In an electric projector lamp comprising a light transmitting envelope defining a longitudinal axis concentric therewith, lead-in wires, and a filament having conducting support members projecting therefrom and being supported in a predetermined position relative to said longitudinal axis, said filament being arranged for electrical connection with said lead-in wires; a current-carrying bi-metallic element integral with one of said support members and arranged to deflect said filament a predetermined distance relative to said axis responsive to the quantity of energy supplied to said filament.

14. In an electric projector lamp comprising a light transmitting envelope defining a longitudinal axis concentric therewith, lead-in wires, and a filament having support members projecting therefrom and being supported in a predetermined position relative to said longitudinal axis, said filament being arranged for electrical connection with said lead-in wires; a bi-metallic element operatively associated with said filament to move said filament a predetermined distance relative to said axis responsive to the quantity of radiant energy emanating from said filament.

15. In an electric projector lamp comprising a light transmitting envelope defining a longitudinal axis concentric therewith, lead-in wires, and a filament having support members projecting therefrom and being supported in a predetermined position relative to said longitudinal axis, said filament being arranged for electrical connection with said lead-in wires; a thermally responsive actuator, operatively associated with said filament, and an auxiliary heating means for motivating said actuator responsive to electrical energy supplied to said means, said actuator being arranged to move said filament a predetermined distance from said axis responsive to the quantity of energy supplied to said heating means.

16. In an electric projector lamp comprising, a light transmitting envelope defining a longitudinal axis concentric therewith, lead-in wires, and a filament having support members projecting therefrom and being supported in a predetermined position relative to said longitudinal axis, said filament being arranged for electrical connection with said lead-in wires; a bi-metallic actuator operatively associated with said filament, and a heater coil for motivating said actuator responsive to electrical energy supplied to said coil, said actuator being arranged to move said filament a predetermined distance from said axis responsive to the quantity of current supplied to said prime mover.

References Cited in the file of this patent

UNITED STATES PATENTS

| | | |
|---|---|---|
| 1,700,226 | House | Jan. 29, 1929 |
| 1,861,752 | Patterson | June 7, 1932 |
| 1,936,762 | Howe | Nov. 28, 1933 |
| 2,021,611 | Rolph | Nov. 19, 1935 |
| 2,041,707 | Harding | May 26, 1936 |
| 2,184,004 | Pennow | Dec. 19, 1939 |
| 2,556,870 | Clark | June 12, 1951 |
| 2,582,742 | Bartow | Jan. 15, 1952 |
| 2,588,154 | Oestnaes | Mar. 4, 1952 |

OTHER REFERENCES

Landing Aids Experiment Station final report for 1947 on Airfield Lighting, pp. 7 and 8 cited.